US009939246B2

(12) United States Patent
Louvigne et al.

(10) Patent No.: US 9,939,246 B2
(45) Date of Patent: Apr. 10, 2018

(54) AMPLIFIED PASSIVE AND REVERSIBLE MICRO-SENSOR OF DEFORMATIONS

(71) Applicants: ETAT FRANCAIS represente par LE DELEGUE GENERAL POUR L'ARMEMENT, Paris (FR); SILMACH, Besancon (FR)

(72) Inventors: Pierre-Francois Louvigne, Sceaux (FR); Patrice Minotti, Gennes (FR); Paul Vescovo, Besancon (FR); Vianney Sadoulet, Venise (FR)

(73) Assignees: ETAT FRANCAIS REPRESENTE PAR LE DELEGUE GENERAL POUR L'ARMEMENT, Paris (FR); SILMACH, Besancon (FR)

( * ) Notice: Subject to any disclaimer, the term of this patent is extended or adjusted under 35 U.S.C. 154(b) by 42 days.

(21) Appl. No.: 14/901,872

(22) PCT Filed: Jul. 1, 2014

(86) PCT No.: PCT/FR2014/000157
§ 371 (c)(1),
(2) Date: Dec. 29, 2015

(87) PCT Pub. No.: WO2015/001204
PCT Pub. Date: Jan. 8, 2015

(65) Prior Publication Data
US 2016/0370164 A1     Dec. 22, 2016

(30) Foreign Application Priority Data

Jul. 2, 2013   (FR) ..................................... 13 01556

(51) Int. Cl.
*G01B 5/00*     (2006.01)
*G01D 5/00*     (2006.01)
(Continued)

(52) U.S. Cl.
CPC ................. *G01B 5/30* (2013.01); *G01D 5/04* (2013.01)

(58) Field of Classification Search
None
See application file for complete search history.

(56) References Cited

U.S. PATENT DOCUMENTS 5,452,335 A * 9/1995 Slater ............... A61B 17/00234
377/25
5,962,792 A   10/1999 Kimerer, Jr.
(Continued)

FOREIGN PATENT DOCUMENTS

EP     1 998 144 A2    12/2008
FR     2 857 770 A1     1/2005
(Continued)

OTHER PUBLICATIONS

International Search Report, dated Sep. 26, 2014, from corresponding PCT application.
(Continued)

*Primary Examiner* — Peter Macchiarolo
*Assistant Examiner* — Jermaine Jenkins
(74) *Attorney, Agent, or Firm* — Young & Thompson (57) ABSTRACT

The disclosed micro-sensor includes: a substrate including a first portion and a second portion; a third portion and fourth portion provided between the portions and connected to the first portion and the second portion respectively by an elastic member; detection and a counter including: a counting gear, a third beam capable of meshing with the gear, an amplifier for the value of a relative movement between the portions and including: a first beam attached at one end thereof to the third portion and at the other end thereof to a plate, a second beam attached at one end thereof to the fourth portion and at the other end thereof to the plate, the third beam being
(Continued)

attached on one side to the plate and including a tooth capable of meshing with the gear.

13 Claims, 6 Drawing Sheets

(51) Int. Cl.
  G01B 5/30     (2006.01)
  G01D 5/04     (2006.01)

(56) References Cited

U.S. PATENT DOCUMENTS

| 9,140,584 B2* | 9/2015 | Louvigne ................ G01B 5/30 |
| 2007/0029341 A1 | 2/2007 | Stradella et al. |
| 2014/0060208 A1 | 3/2014 | Louvigne et al. |

FOREIGN PATENT DOCUMENTS

| FR | 2 893 139 A1 | 5/2007 |
| FR | 2 974 410 A1 | 10/2012 |
| WO | 2012/153335 A1 | 11/2012 |

OTHER PUBLICATIONS

FR Search Report, dated Jan. 23, 2014, from corresponding FR application.

* cited by examiner

AMPLIFIED PASSIVE AND REVERSIBLE MICRO-SENSOR OF DEFORMATIONS

FIELD OF THE INVENTION

The present invention relates to the field of micro-sensors and, more particularly, to a micro-sensor adapted to detect and, preferably also to count, the number of the cycles of variations in distance between two points or areas of a structure subjected to a repeated external action, for example, temperature or mechanical stress cycles such as for example the number of passages of vehicles over a bridge, generating a known level of stress in the structure.

BACKGROUND OF THE INVENTION

In this field is known patent application EP1998145 which describes a passive and reversible micro-sensor for counting the number of stress cycles experienced by a structure which may, for example, correspond to the number of temperature cycles, of tensile, compressive and/or bending mechanical stress cycles, generated, for example, by mobiles passing on this structure, whose size, advantageously, does not exceed 5 cm in its largest dimension, and preferably 2 cm, and having a virtually unlimited service life, which can be used in pyrotechnic safety, having no sensitivity to electromagnetic fields and which enables an error-free counting of this number of cycles or passages.

Figure 1A:
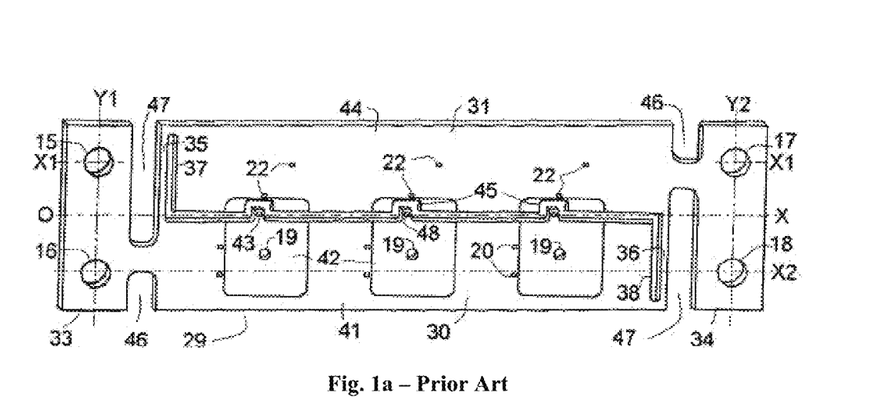
FIG. 1a shows a known diagram of a support usable in a reversible and passive sensor for deformations.
Figure 1B:
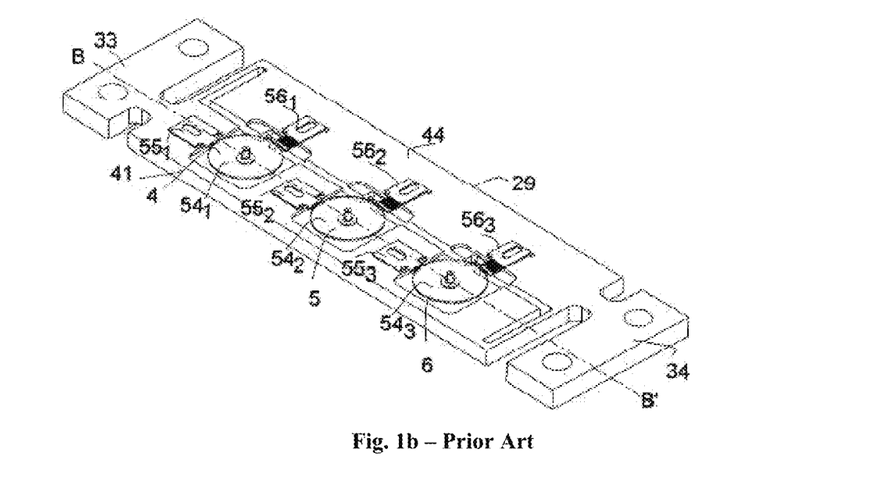
FIG. 1b shows a perspective view of the support of FIG. 1a on which detecting and counting means have been arranged.

By reversible is meant a micro-sensor adapted to detect a cycle of variations in distance without deteriorating, thus adapted to then detect another cycle. By passive means are to be understood means operating without an energy source unlike the so-called active means used in the aforementioned patent applications and which use an energy source, namely a power supply. This micro-sensor comprises means for detecting and counting the cycles of variations in distance between two points or areas of a structure, these means comprising a support having first and second portions each having an anchoring area, these anchoring areas being adapted to be attached to one and the other of said two points or areas of the structure, respectively, and being constituted by studs, notches and/or bores and having dimensions smaller than those of the first and second portions, the counting means being associated with each of said first and second portions of the support. Also known is patent application FR2974410 which describes a passive and reversible micro-sensor for counting the number of stress cycles experienced by a structure and adapted to detect several different stress thresholds. Such a micro-sensor is shown in FIGS. 1a and 1b, without and with detecting means and counting means, respectively.

It comprises a support 29 with first and second L-shaped subassemblies 30, 31, arranged head-to-tail and separated mainly longitudinally along an axis OX by a space 32 and whose respective bases 33, 34 are, in part, anchoring areas of the support 29 on the structure to be monitored.

These bases 33, 34 each comprise two bores 15, and 17, 18. The axes Y1 and Y2 passing through the centers of the bores 15, 16 and 17, 18, respectively, are perpendicular to the OX axis, while the axes X1 and X2 passing through the centers of the bores 15, 17 and 16, 18, respectively, are parallel to the OX axis. In addition, these first and second longitudinal portions 41; 44 are connected to each other at their ends 37, 38 by an elastic member, in this case a material cord 35 and 36.

The second portion 41 of the first subassembly 30 comprises three bores 19 regularly distributed along the axis OX as well as three pairs of bores 20, the axis passing through the centers of a pair of bores being parallel to the axis Y1 and each one of the pairs is associated with one of the bores 19. Each bore 20 is intended to receive an axis projecting from the support and adapted to allow a prepositioning of non-return means.

This second portion 41 comprises as many substantially square-shaped depressions 42 as bores 19, each depression being centered around one of the bores 19. It also comprises three crenels 43 projecting from the side surface of the second portion 41 of the first subassembly located facing the second portion 44 of the second subassembly 31. For each one of the bores 19, the axis passing through its center and parallel to the axis Y1 is also an axis of symmetry of one of the crenels 43. Each one of these crenels comprises, in its middle portion, a bore 48. The second portion 44 of the second subassembly 31 comprises three pairs of bores 22 distributed the same as the bores 19 along the OX axis, each one of the pairs 22 being associated with one of the bores 19. Each bore 22 is intended to receive an axis projecting from the support and adapted to allow a prepositioning of driving means. In addition, the side surface of the second portion 44 of the second subassembly 31 located facing the second portion 41 of the first subassembly 30 comprises notches 45 of dimensions greater than those of the crenels 43 and intended to allow the introduction of the crenels therein. Each one of the bases 33, 34 is partially separated from the corresponding second portion of the L by two facing coaxial notches 46, 47.

The small notches 46 are not absolutely essential, they have however the following advantages:—facilitating the rotation of the 2 anchoring areas with respect to each other. Indeed, when the indicator is mounted on a structure subjected to bending, there is a rotation of the straight sections. Such an architecture, providing elasticity (compliance), thus allows to prevent the constraints from growing unnecessarily.—centering the base with respect to the corresponding second movable portion of the support,—leaving, at the bases, only the required material for withstanding the tensile or compressive stresses.

The large notches 47 allow to create the elastic members, namely material cords 35, 36 for securing the subassemblies 30, 31 to each other. FIG. 1b shows a perspective view of the support of FIG. 1a on which have been arranged detecting means and counting means. On the support 29 are arranged three assemblies 4, 5, 6 each comprising:
  axes force-fitted into the bores 19, 20 and 22 and projecting from the support 29 and serving as a stop or an axis of rotation,
  a toothed wheel $54_1$, $54_2$ or $54_3$,—non-return means $55_1$, $55_2$ or $55_3$—driving means $56_1$, $56_2$ or $56_3$.

In order to enable the detection of several different thresholds of deformations, the toothed wheels $54_1$, $54_2$ or $54_3$ have a tooth pitch different from one wheel to the other.

The devices according to these patents are sized according to the expected deformation and the technological production limitations of the several building blocks including, mainly, the tooth pitch of the counting wheels, the resolution being at most equal to that pitch.

Thus, for a given tooth pitch, the smaller the deformation to be detected and to be counted, the greater the size of the micro-sensor and therefore the greater its weight.

Yet, in some sectors such as the aeronautics field, the mass of the components should be as small as possible. Therefore, the size of the micro-sensors has to be as small as possible in consistency with the detection and the counting of the deformations.

Furthermore, the use of silicon for the manufacture of the counting wheels allows to obtain a very small tooth pitch, of the order of 100 µm, or even smaller. However, the manufacturing technology of silicon wheels is complex and it may be preferred, in some cases, to use a simpler technology such as that of metals. However, with metals, a tooth pitch of the order of 400 µm can be reached at best, which requires, for a same value of a detected and counted deformation, to implement supports at least four times larger than in the context of silicon counting wheels. Indeed, for very low amplitude deformations, the previous inventions have an architecture whose movable portion which serves to mesh with the counting wheel moves with an amplitude similar to that of the movement associated with the event. If the event is of a very low amplitude, the stroke of the movable portion may be insufficient to cause the meshing. This limitation is related to the ratio of the number of teeth to the diameter of the tooth.

SUMMARY OF THE INVENTION

The aim of the invention is to solve the aforesaid drawbacks by providing a passive and reversible micro-sensor for counting the number of stress cycles experienced by a structure allowing, compared to those described in patent applications EP1998145 and FR2974410, one the hand to reduce their size, and therefore their surface overall dimensions, preferably by a factor at least equal to 4, for a given size of the micro-sensor and on the other hand, to detect and count values of deformations experienced by a structure at least four times lower than those detected and counted by a micro-sensor according to the aforementioned patent applications. Thus, in some cases, it will be possible to use the metals technology for producing the counting means, the latter being much simpler than that of silicon.

The provided solution is a passive and reversible micro-sensor of deformations along a longitudinal direction OX of a structure, particularly during temperature or mechanical stress cycles experienced by that structure, this micro-sensor comprising means for detecting and counting the cycles of variations in distance between two points or areas of a structure as well as:
  a support comprising:
    a first portion having an anchoring area adapted to be attached to a first one of said two points or areas of the structure,
    a second portion having an anchoring area adapted to be attached to the second one of said two points or areas of the structure,
    a third portion longitudinally arranged between the first portion and said first one of said two points or areas of the structure and attached by a first longitudinal end to the first portion,
    a fourth portion longitudinally arranged between the second portion and said second one of said two points or areas of the structure and attached by a first longitudinal end to the second portion,
  means for detecting and counting the cycles of variations in distance between said two points or areas of a structure comprising:
    at least a first counting toothed wheel arranged on one of said first, second, third and fourth portions,
    at least a third beam attached to the support and comprising a tooth at its free end, this tooth being adapted to mesh with said toothed wheel, this micro-sensor being characterized:
in that the support comprises means for amplifying the value of a relative movement between said first and second portions of the support, these means comprising:
  a first beam attached at one of its ends to the third portion and at its other end to a first plate,
  a second beam attached at one of its ends to the fourth portion and at its other end to said first plate,
and in that the third beam is attached on one side to said plate, or to a member which is secured thereto,
said plate and the first, second and third beams being arranged so that any variation in distance $\Delta x$ between said first and second portions of the support produces a corresponding movement $\Delta y$ of the plate of the tooth along a different direction and with $\Delta y > \Delta x$ and, preferably, $\Delta y > 4\Delta x$.

According to a particular feature, the invention relates to a passive and reversible micro-sensor of deformations along a direction OX of a structure, particularly during temperature or mechanical stress cycles experienced by that structure, this micro-sensor comprising:
  a support comprising:
    a first portion having an anchoring area adapted to be attached to one of said two points or areas of the structure,
    a second portion having an anchoring area adapted to be attached to the other one of said two points or areas of the structure,
    a third portion longitudinally arranged between the first and second portions and connected by a first longitudinal end to the first portion by an elastic member such as a thick cord,
    a fourth portion longitudinally arranged between the first and second portions and connected by a first longitudinal end to the second portion by an elastic member such as for example a thick cord, this first end being preferably also connected to the first longitudinal end of the third portion by a first, at least partially thin cord, and the second longitudinal end of the third portion being also preferably connected to the second longitudinal end of the fourth portion by a second, at least partially thin cord,
  means for detecting and counting the cycles of variations in distance between two points or areas of a structure comprising:
    at least a first counting toothed wheel arranged on one of the third or fourth portions,
    at least a third beam attached to the support and comprising a tooth at its free end, this tooth being adapted to mesh with said toothed wheel, this micro-sensor being characterized in that the support comprises means for amplifying the value of a relative movement between said first and second portions of the support, these means comprising:
      a first beam attached at one of its ends to the third portion and at its other end to a first plate,
      a second beam attached at one of its ends to the fourth portion and at its other end to said first plate,
    and in that the third beam is attached on one side to said plate, or to a member which is secured thereto, and said plate and the first, second and third beams being arranged so that any relative movement $\Delta x$ between said first and second portions of the support produces a corresponding movement $\Delta y$ of the tooth along a different direction and with $\Delta y > \Delta x$ and, preferably, $\Delta y > 4\Delta x$.

By thick or thin cord is meant that the thin cord is at least two times less wide than the thick cord, preferably at least five times less wide.

By plate is meant any three-dimensional member with at least one of its dimensions much greater than at least one of the other.

According to an additional feature, the support comprises a longitudinal middle plane and the first and second beams form an angle with the middle plane between 0 and 45 degrees.

According to a particular feature, the first and second beams are arranged on the same side of the plate.

According to a particular feature, the first and second beams are parallel to each other and, preferably, the third beam is arranged perpendicular to the first two. This beam system allows to amplify the initial movement by a factor of the order of 5, this factor depending on the dimension of the plate and on the distance between the attachment points of the beams on said plate.

According to a particular feature allowing to minimize the volume of the micro-sensor, the plate and the first, second, third and fourth portions of the support are arranged in a same plane and, advantageously, the first plate is arranged between the third and fourth portions of the support and delimited by a through groove except at the connections with said first and second beams.

According to a particular feature, allowing to count two different thresholds of deformation, a micro-sensor according to the invention comprises:
  a first toothed wheel arranged on the third portion of the support, the third beam comprising a tooth adapted to mesh with this first toothed wheel,
  a second toothed wheel arranged on the fourth portion of the support, a fourth beam arranged transversely and attached on one side to said plate, or to a member which is secured thereto, and comprising, at its free end, a tooth adapted to mesh with said second toothed wheel.

According to another feature, the first and second longitudinal beams have a length at least equal to half that of the third and fourth portions of the support, the measurements being taken along the longitudinal direction of the support.

The aim of this micro-sensor is to amplify the relative movement between the two attachments, due to a mechanically or thermally generated stress, with an overall dimension up to five times smaller than that of a micro-sensor according to the prior art. In operation, assuming that one of the attachments remains stationary and that the other attachment undergoes a horizontal movement to the right, the first beam will remain stationary while the second one will undergo the same movement as the corresponding attachment. Since the two beams are connected through the—rigid—attachment plate, the latter will undergo a vertical movement (combination of a rotation and a displacement). It is this displacement that will be detected and measured through counting wheels. An example of deformation of the plate is shown in FIG. 3, when a traction is exerted on the ends of the attachments.

This beam system allows to amplify the initial movement by a factor of the order of 5.

A micro-sensor according to the invention can detect and count either the occurrence of a deformation or the number of cycles experienced by a structure.

BRIEF DESCRIPTION OF THE DRAWINGS

Other advantages and features of the invention will become apparent with the description of several embodiments of the invention and with regard to the appended figures in which.

DETAILED DESCRIPTION OF THE INVENTION

Figure 2:
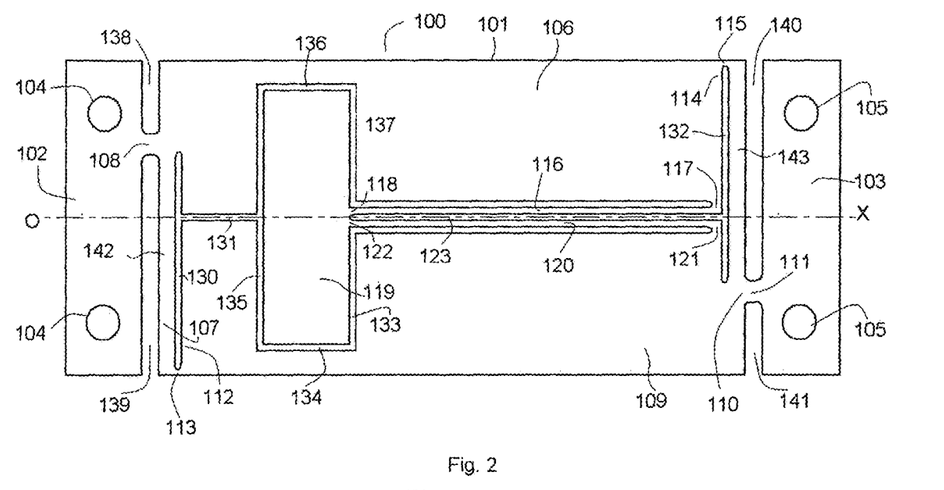
FIG. 2 shows a first example of a support of a micro-sensor according to the invention.

FIG. 2 shows a first example of a support 101 of a micro-sensor according to the invention. This passive and reversible micro-sensor of deformations along a longitudinal direction OX of a structure, particularly during temperature or mechanical stress cycles experienced by that structure, is arranged longitudinally along the longitudinal direction OX of the structure and it comprises:
  a mainly planar support 101 having:
    first and second portions 102, 103 each having two anchoring areas 104, 105, these anchoring areas being adapted to be attached to one and the other of said two points or areas of the structure, respectively, and being constituted by through circular bores,
    a third portion 106 longitudinally arranged between the first and second portions and connected by a first longitudinal end 107 to the first portion 102 by a thick cord 108 and separated from the first portion by large notches 138, 139,
    a fourth portion 109 longitudinally arranged between the first and second portions 102, 103 and connected by a first longitudinal end 110 to the second portion 103 by a thick cord 111, the second longitudinal end 112 of the fourth portion 109 being also connected to the first longitudinal end 107 of the third portion 106 by a first thin cord 113, and the second longitudinal end 114 of the third portion 106 being connected to the first longitudinal end 110 of the fourth portion by a second thin cord 115. The fourth portion is also separated from the second portion by large notches 140, 141,
  means for amplifying the deformation undergone by the support structure comprising:
    a first beam 116 arranged longitudinally and attached at a first longitudinal end 117 to the third portion 106 and at its other longitudinal end 118 to a first plate 119,
    a second beam 120 arranged longitudinally and parallel to the first one and attached at a first longitudinal end 121 to the fourth portion 109 and at its other longitudinal end 122 to said first plate 119, the first and second beams being separated by a longitudinal through groove 123, The third and fourth portions are separated mainly by through grooves 130, 131, 123, 132 and the first plate 119 is separated from the third and fourth portions by through grooves 133, 134, 135, 136 and 137, these grooves delimiting the plate 119.

The bores 104, 105 are not absolutely essential, they have however the following advantages:—facilitating the rotation of the 2 anchoring areas with respect to each other. Indeed, when the indicator is mounted on a structure subjected to bending, there is a rotation of the straight sections. Such an architecture, providing elasticity (compliance), thus allows to:

prevent the constraints from growing unnecessarily, center the base with respect to the corresponding second movable portion of the support, leave, at the bases, only the required material for withstanding the tensile or compressive stresses.

The large notches 138, 139, and 140, 141, respectively, allow to create the elastic members, namely the thick material cords 108, and 111, respectively, for securing the first and third portions 102, 106, and the second and fourth portions 103, 109, respectively, there between. These thick cords 108, 111 allow to secure, on the one hand the first and third portions 102, 106 and, on the other hand, the second and fourth portions 103, 109, respectively, so that when the first portion 102 moves longitudinally relative to the second portion 103, the third portion follows the movement of the first portion and moves in an identical manner to the latter. In addition, these thick cords ensure a transverse elasticity of the support useful when the first portion moves relative to the second one 103 not only longitudinally but also transversely.

The thin cords 113 and 115 allow to maintain the positioning of the first, second, third and fourth portions during the transport phase and then the attachment of the support on a structure, while the material cords 142, 143 located between each thin cord and the corresponding thick cord act a spring for moving almost without constraint the first and third portions relative to the second and fourth portions.

Figure 3A:
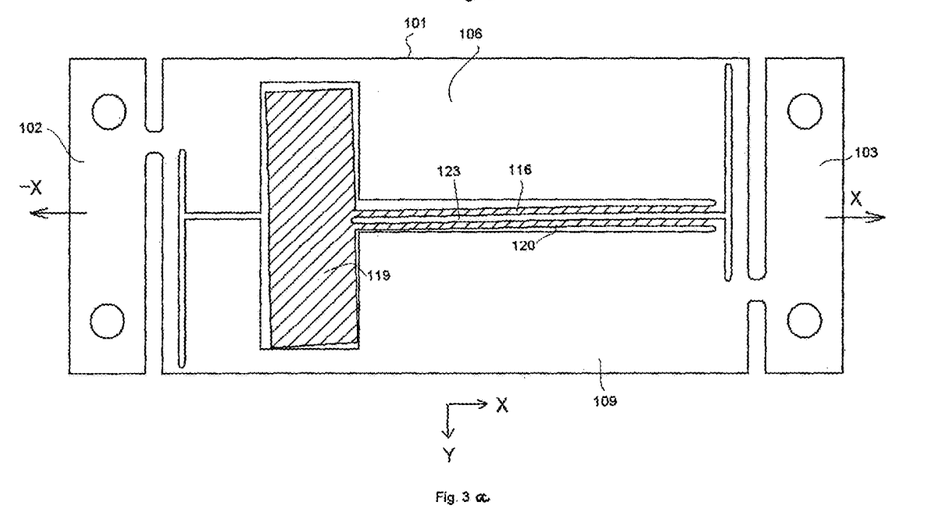
FIG. 3 shows the same device as that of FIG. 2 but having undergone a deformation.

FIG. 3a shows the same device as that of FIG. 2 but having undergone a deformation, in this case the first and second portions of the support 100 having moved away from each other as symbolized by the direction of the arrows. The shown deformation is exaggerated compared with reality and shown in more detail in FIG. 3b and this, in order to facilitate understanding.

Figure 3B:
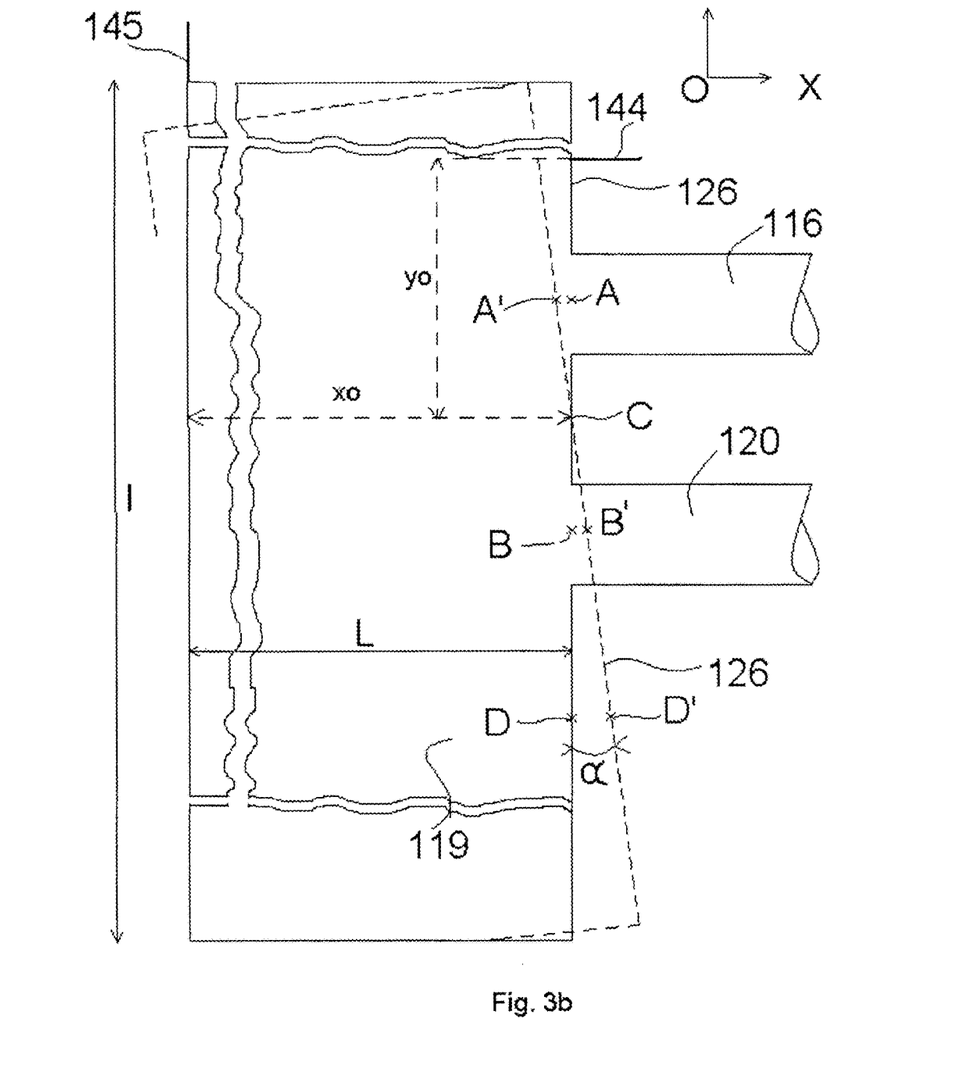

In addition, in FIG. 3a, the first plate 119 and the first and second beams 116, 120 of the amplification means have been hatched in order to facilitate reading of the figure while in FIG. 3b, the position of the side face 126 of the plate 119 after deformation is shown in dotted lines.

With respect to FIG. 2, the first portion 102 has moved in the direction (−X) by a distance (−ΔX) while the second portion has moved in the direction X by a distance (ΔX), as may occur for instance during heating of the structure supporting the support 100.

It is noted that point A of the beam 116 located in the middle plane of the latter at the intersection with the plate 119 has also moved in translation by a distance (−ΔX), then becoming point A', while point B of the beam 120 in the middle plane of the latter at the intersection with the plate 119 has also moved in translation but with a distance (ΔX), then becoming point B', these movements causing a rotation of the plate and therefore in particular of the side face 126 with an angle α with $tg(\alpha)=BB'/CB=2\cdot(\Delta X)/AB$ with C being the point located in the middle of the segment AB.

For any point D located at the side face 126 of the plate 119 or of its opposite face, the movement of that point after deformation will be equal to:

$$\Delta X_D = tg(\alpha)\cdot CD = 2\cdot CD\cdot(\Delta X)/AB$$

Therefore, it is noted that for any given distance variation ΔX, the smaller the distance AB, the greater the amplification. Similarly, the further apart point D is from point C, the greater the amplification. On the other hand, the length of the beams 116, 120 has no influence.

Similarly, the movement $\Delta Y_L$ along the Y axis of the side face 127 opposite to the side face 126 of the plate is equal to:

$$\Delta XL = tg(\alpha)\cdot L = 2L\cdot(\Delta X)/AB$$

where L is the width of the plate, namely the distance between the faces 126 and 127.

Figure 5:
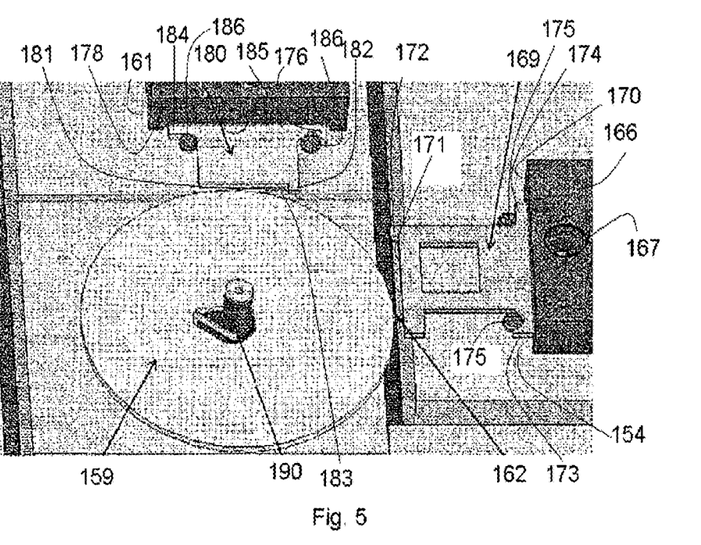
FIG. 5 shows a more detailed schematic drawing of the second assembly of detecting and counting means according to FIG. 4.

It is noted that if L is greater than half the height of the plate 119, the amplification of the movement is greater on the Y axis than on the X-axis and vice versa. Furthermore, as before, the smaller the distance AB, the greater the amplification. Similarly, the further apart point D is from point C, the greater the amplification. Thus, in the case where a toothed beam 144 for driving a detecting and counting toothed wheel is attached directly to the plate along the direction OX, then, in order to obtain an amplification factor ξ, it is necessary to attach it at a distance yo from point C, along the axis OY, equal to ξ·AB/2, whereas in the case where a toothed beam 145 for driving a detecting and counting toothed wheel is attached directly to the plate in the direction OY, then, in order to obtain an amplification factor ξ, it is necessary to attach it a distance xo from C, along the axis OX, equal to ξ·AB/2. The same considerations apply when the toothed beam is attached to a support assembly itself attached to the plate as shown in FIG. 5. Thus, the movement ΔX is amplified at least by a factor ξ. It is then sufficient to place the detecting means taking into account these considerations to amplify the micro movements ΔX by a factor $\xi=\Delta X_L/\Delta X$ or $\xi=\Delta X_D/\Delta X$.

Figure 4:
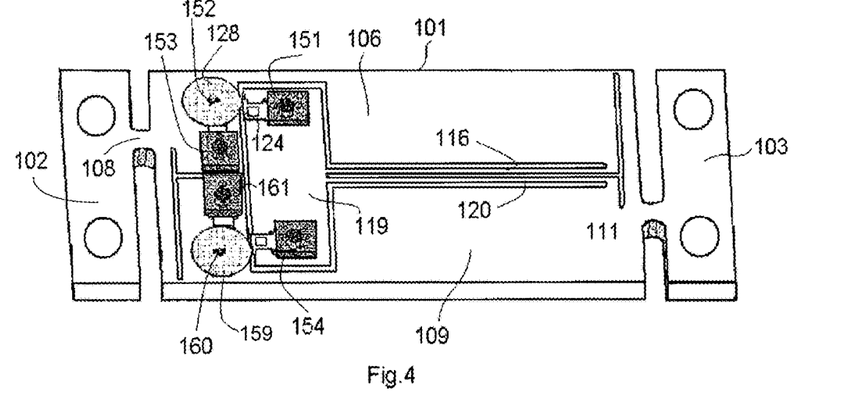
FIG. 4 shows a support according to FIG. 2 onto which have been placed two assemblies of means for detecting and counting the number of deformation cycles experienced by a structure onto which it is attached.

FIG. 4 shows a support according to FIG. 2 onto which have been reported two assemblies of means 150, 160 for detecting and counting the number of deformation cycles experienced by a structure onto which it is attached.

The first assembly of detecting and counting means 150, hereinafter referred to as first detecting means, comprises:

a support assembly 151 attached to the first plate 119, a third beam 124 arranged transversely and with a first end attached to the assembly 151 while its second end is free and comprises a tooth, a first counting toothed wheel 128 arranged on the third portion 106 and connected thereto by a pivot connection 152, the tooth 127 of the third beam 124 being meshed with this toothed wheel 128, a non-return device 153 of this toothed wheel 128 attached to the third portion 106 of the support.

The second assembly of detecting and counting means 151, hereinafter referred to as second detecting means, comprises:

a support assembly 154 attached to the plate 119. A fourth transversely arranged beam 162 comprises a first end 156 attached on one side to said support assembly 154 and its second end 157 is free and comprises a tooth, a second counting toothed wheel 159 arranged on the fourth portion 109 and connected thereto by a pivot connection 160, with the tooth of the fourth beam 162 being meshed with this toothed wheel 159, a non-return device 161 of this toothed wheel 159 attached to the fourth portion 109 of the support.

In this embodiment, the first and second toothed wheels have the same diameter but different numbers of teeth, namely 1000 for the first one and 500 the second one 159, one having thus a pitch p2 twice smaller than that p1 of the other. Thus, the deformation ΔX underwent by the structure will be detected or not depending on its value, on that of the pitch and on the amplification rate $\zeta$ of the deformation generated by the micro-sensor as shown in the table below.

| Deformation ΔX | Lower than (p1/$\zeta$) | Between (p1/$\zeta$) and (p2/$\zeta$) | Greater than (p2/$\zeta$) |
|---|---|---|---|
| Wheel 128 | No detection | Detection | Detection |
| Wheel 159 | No detection | No detection | Detection |

FIG. 5 shows a more detailed schematic drawing of the second assembly of detecting and counting means 154.

This support assembly 154 comprises a second plate 166, one of the main faces of which is attached to the plate 119 by axes 167 force-fitted in the thickness of the two plates. One 170 of the side faces of the second plate 166 serves for supporting and positioning a first side face 168 of a third substantially rectangular and hollowed plate 169. A second side face 171 opposite to the first face 168 comprises, on one of its sides, an extension 172 at the end of which is attached said fourth beam 162. The third plate 169 comprises two side tabs 173, 174 to which are associated axes 175 fitted into the first plate 119 and arranged perpendicular to the third plate, maintaining the latter against the side face 170 of the second plate 166.

The non-return device 161 of this toothed wheel 159 has a fourth plate 176, one of the main faces of which is attached to the first plate 119 by axes force-fitted in the thickness of the two plates. One 178 of the side faces of the third plate 176 serves for supporting and positioning a first side face of a fifth substantially rectangular plate 180. The second side face 181 opposite to the first face 179 comprises, on one of its sides, an extension 182 at the end of which is attached a fifth beam 183, the free end of which comprises a tooth. The fifth plate 180 comprises 2 side tabs 184, 185 to which are associated axes 186 fitted into the plate 119 and arranged perpendicular to the second plate, maintaining it against the side face 178 of the third plate 176.

The toothed wheel 159 is arranged parallel to the fourth portion 109 of the support and connected thereto by a pivot connection 190 and arranged so that the tooth 165 of the fourth beam 162 and that of the fifth beam 183 mesh with those of the toothed wheel 159.

The tooth of the fourth driving beam 162 has a driving face which comes into contact with a tooth of the toothed wheel 159 for driving this wheel in rotation when moving in one direction of the plate 119 and a guiding face allowing sliding, and therefore retraction, of the tooth 165 onto that of the toothed wheel 159 upon movement in the direction opposite to the previous one insofar as the toothed wheel 159 is then blocked by the non-return means 161. The driving beam 162 has an elasticity sufficient to allow the retraction of a tooth without damage. In addition, the driving and non-return beams, 162 and 183, respectively, have a sag when in position against the toothed wheel 159. This initial deformation allows to ensure the contact and therefore the meshing despite the manufacturing/assembly defects and uncertainties.

For counting the deformation cycles, each toothed wheel comprises at its periphery a numbering from 0 to 980 with an increment of 20 teeth for the first toothed wheel 128 and a numbering from 0 to 480 with an increment of 20 teeth for the second toothed wheel 159, while the third portion 106, and the fourth portion 109, respectively, comprises a rectilinear engraving placed along the radius of the wheels and at which is placed, for each one of the wheels, the numbering 0 upon insertion of these wheels onto their corresponding pivot connection. In use, one simply needs to visually read, for each wheel, the numbering displayed at the rectilinear engraving.

In this embodiment, the support and the counting means are made of silicon.

For a given deformation cycle value, a micro-sensor according to the invention will have a size 5 times smaller than that of a micro-sensor according to the patent application FR2974410.

Figure 6:
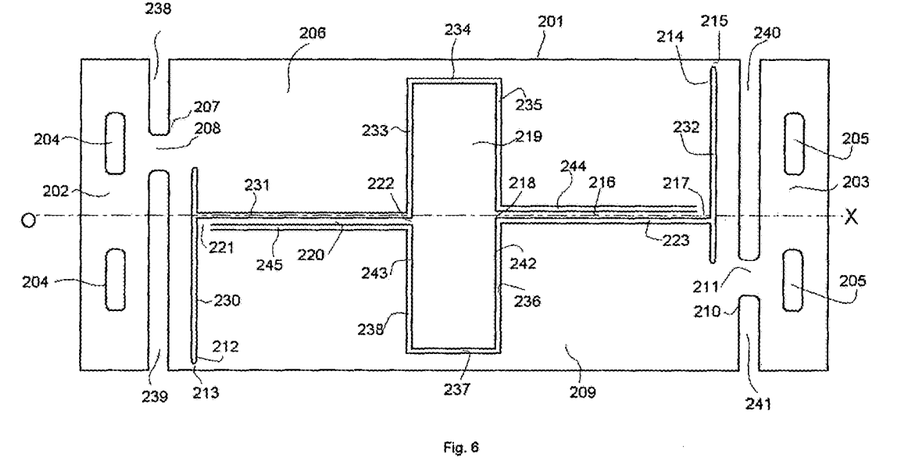
FIG. 6 shows a second example of a support of a micro-sensor according to the invention.

This micro-sensor 100 is totally passive, and it is the event itself (action of an object capable of bending a structure) that provides the energy required for the activation of the detecting and counting functions. In the present case, the micro-sensor is operated for a period which is not limited by the lifetime of the energy source. Given the nature itself of the materials used, in this case silicon, the life expectancy of the micro-sensor is in any case much greater than that of all weapon or other systems, including passive systems stored for very long periods. In the present case, the inert character of the counter allows to consider applying it to a system operating in pyrotechnic safety, which provides a significant progress over current capabilities. In addition, a micro-sensor according to the invention is completely insensitive to electromagnetic fields. In addition, it allows to simplify the assembly: fewer implantations (number of threaded holes, bonding, flanges), to reduce the cost and to increase the discretion. Moreover, the provided solution is very easy to implement and its operation is very reliable. It is independent of a power source, discreet and of a low unit cost. Moreover, the tooth of the non-return beam can be replaced with a friction pad adapted to apply a friction force on the counting toothed wheel. It has two roles. In both cases, it is the friction force of the pad onto the wheel that allows it to play its role. This friction force is determined by the preload of the pad beam. On the one hand, it limits an excessive rotation due to the inertial effects of the counting wheel in the normal direction of rotation. On the other hand, it prevents a rotation of the counting wheel in the direction opposite to the normal direction during returning of the driving tooth, provided that the friction force of the pad is greater than that of the driving beam on the wheel. Furthermore, in the case where it is desired to compensate for differences in thermal expansions between the micro-sensor and the structure, it is, on the one hand, preferable to make the supports of the micro-sensor in a material with a thermal expansion coefficient close to that of the material of the structure, and, on the other hand, to geometrically compensate, via the shape of said first and second portions of the support and the positioning of the counting wheel, for this thermal expansion FIG. 6 shows a second example of a support 201 of a micro-sensor according to the invention. This passive and reversible micro-sensor of deformations along a longitudinal direction OX of a structure, particularly during temperature or mechanical stress cycles experienced by that structure, is arranged longitudinally along the longitudinal direction OX. It comprises a support and means for detecting and counting the cycles of variations in distance between two points or areas of a structure, with the support 201 being mainly planar and having:

a first and a second portions 202, 203 each having two anchoring areas 204, 205, these anchoring areas being adapted to be attached to one and the other of said two points or areas of the structure, respectively, and being constituted by through oblong notches, a third portion 206 longitudinally arranged between the first and second portions and connected by a first longitudinal end 207 to the first portion 202 by an elastic member, namely a thick cord 208, and separated from the first portion by large notches 238, 239, a fourth portion 209 longitudinally arranged between the first and second portions 202, 203 and connected by a first longitudinal end 210 to the second portion 203 by a thick cord 211, the second longitudinal end 212 of the fourth portion 209 being also connected to the first longitudinal end 207 of the third portion 206 by a first thin cord 213, and the second longitudinal end 214 of the third portion 206 being connected to the first longitudinal end 210 of the fourth portion by a second thin cord 215. The fourth portion is also separated from the second portion by large notches 240, 241, means for amplifying the deformation undergone by the support structure comprising:

a first beam 216 arranged longitudinally and attached at a first longitudinal end 217 to the third portion 206 and at its other longitudinal end 218 at a first side face 242 of a plate 219, a second beam 220 arranged longitudinally and parallel to the first one and attached at a first longitudinal end 221 to the fourth portion 209 and at its other longitudinal end 222 to a second side face 243 of said plate 219 opposite to the first side face 242, the first and second beams being parallel and placed on either side of the longitudinal middle plane of the support.

The first beam 216 is longitudinally delimited by two grooves 223, 244, while the second beam 220 is longitudinally delimited by two grooves 231, 245.

The third and fourth portions are separated mainly by through grooves 230, 231, 223, 232 and the plate 219 is separated from the third and fourth portions by through grooves 233, 234, 235, 236, 237 and 238, these grooves delimiting the plate 219.

The detecting and counting means described in the context of FIGS. 4 and 5 can be used in the same manner in the context of this FIG. 6.

Figure 7:
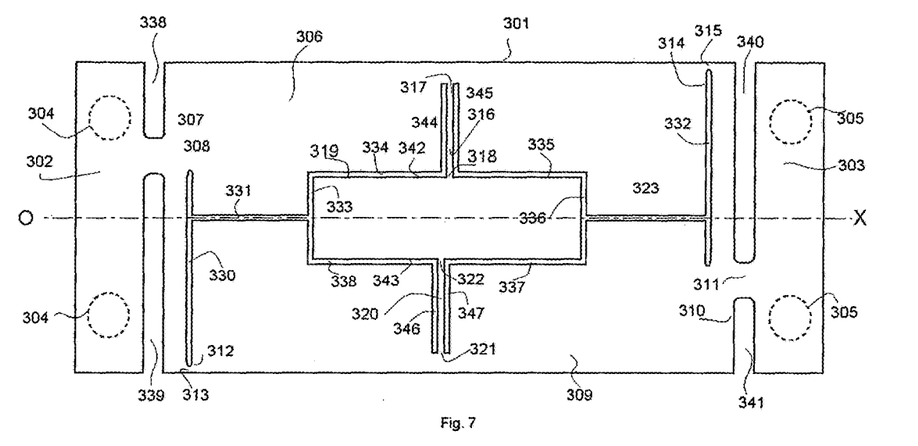
FIG. 7 shows a third example of a support of a micro-sensor according to the invention.

FIG. 7 shows a third example of a support 301 of a micro-sensor according to the invention. This passive and reversible micro-sensor of deformations along a longitudinal direction OX of a structure, particularly during temperature or mechanical stress cycles experienced by that structure, comprises a support and means for detecting and counting the cycles of variations in distance between two points or areas of a structure, with the support 301 being mainly planar and having:

first and second portions 302, 303 each having two anchoring areas 304, 305, these anchoring areas being adapted to be attached to one and the other of said two points or areas of the structure, respectively, and being constituted by studs shown in dotted lines because they are located on the rear face of the support, a third portion 306 longitudinally arranged between the first and second portions and connected by a first longitudinal end 307 to the first portion 302 by an elastic member, namely a thick cord 308, and separated from the first portion by large notches 338, 339, a fourth portion 309 longitudinally arranged between the first and second portions 302, 303 and connected by a first longitudinal end 310 to the second portion 303 by a thick cord 311, the second longitudinal end 312 of the fourth portion 309 being also connected to the first longitudinal end 307 of the third portion 306 by a first thin cord 313, and the second longitudinal end 314 of the third portion 306 being connected to the first longitudinal end 310 of the fourth portion by a second thin cord 315. The fourth portion is also separated from the second portion by large notches 340, 341, a first beam 316 arranged transversely and attached at a first longitudinal end 317 to the third portion 306 and at its other longitudinal end 318 to a first side face 342 of a first plate 319, a second beam 320 arranged transversely and parallel to the first one and attached at a first longitudinal end 321 to the fourth portion 309 and at its other longitudinal end 322 to a second side face 343 of the plate 319 opposite to the first side face 342, the first and second beams being parallel and placed on either side of the transverse middle plane of the support.

The first beam 316 is longitudinally delimited by two grooves 344, 345, while the second beam 320 is longitudinally delimited by two grooves 346, 347.

The third and fourth portions are separated mainly by through grooves 330, 331, 323, 332 and the plate 319 is separated from the third and fourth portions by through grooves 333, 334, 335, 336, 337 and 338, these grooves delimiting the plate 319.

The detecting and counting means described in the context of FIGS. 4 and 5 may be used, but offset by an angle of $\pi/2$ Rd, with the third and fourth beams of the counting means being arranged longitudinally.

Figure 8:
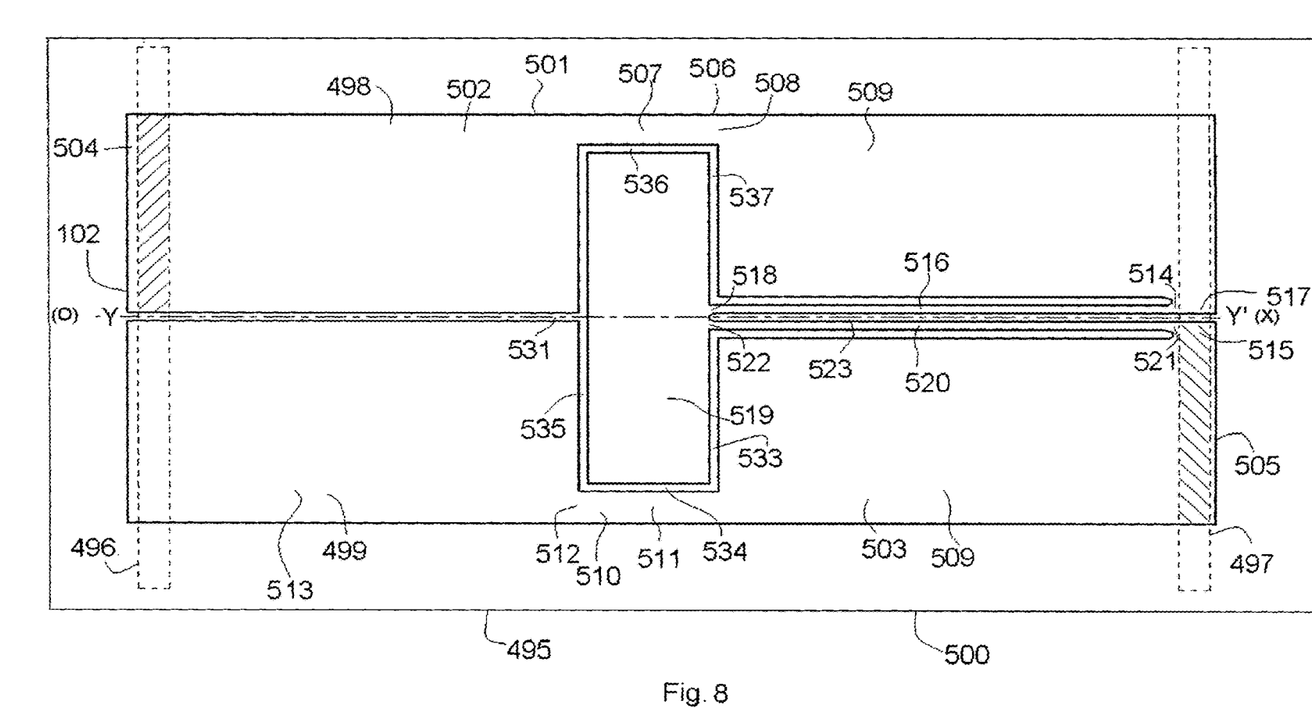
FIG. 8 shows a fourth example of a support of a micro-sensor according to the invention.

FIG. 8 shows another example of a support 501 of a passive and reversible micro-sensor according to the invention. This micro-sensor comprises:

a) means for detecting and counting, not shown in this figure but comparable to those of FIGS. 4 and 5, the cycles of variations in distance between the first and second areas 495, 496 of a structure 497, b) a support 501 mainly planar and symmetrical with respect to a longitudinal middle plane YY' intended to be arranged along a longitudinal direction OX of the structure and having two U-shaped assemblies 498, 499 arranged head-to-tail, c) means for amplifying the deformation undergone by the structure 497.

The first assembly 498 of the support 501 comprises an inverted L-shaped first portion 502 intended to be anchored, at a first longitudinal end 504 and as shown by hatching, to said first area 495 while its second longitudinal end 506 comprises a band 507 shaped as a thick cord and transversely less wide and constituting the base of the U and whose opposite longitudinal end 508 is connected to a third portion 509 constituting the second arm of the U and longitudinally arranged between the first and second areas 495, 496 of the structure 497.

The second assembly 499 of the support 501 comprises an inverted L-shaped second portion 503 intended to be anchored, at a first longitudinal end 505 and as shown by hatching, to said second area 496 while its second longitudinal end 510 comprises a band 511 shaped as a thick cord and transversely less wide and constituting the base of the U and whose longitudinal end 512 is connected to a fourth portion 513 constituting the second arm of the U and longitudinally arranged between the first and second areas 495, 496 of the structure 497.

It should be noted that the first longitudinal ends of the first and second portions 502, 503 are longitudinally opposed. In addition, on the one hand, said bands 507, 511 form elastic members and, on the other hand, the anchorings on the structure 497 may for example be made by bonding.

The means for amplifying the deformation undergone by the support structure comprise:
- a first beam 516 arranged longitudinally and with a first end 514 attached at the free longitudinal end 517 of the third portion 509 and on its side face facing the second assembly while its other longitudinal end 518 is attached to a first plate 519 arranged within the opening delimited by the two U-shaped assemblies arranged head-to-tail and, in particular transversely, by said bands 507 and 511.
- a second beam 520 arranged longitudinally and parallel to the first one and with a first end 521 attached to the free longitudinal end 515 of the second portion 503 and on its side face facing the second assembly while its other longitudinal end 522 is attached to said first plate 519, the first and second beams being separated by a longitudinal through groove 523.

The first and second assemblies are separated mainly by through groove 531, 523 and the first plate 519 is separated from said assemblies 498, 499 by through grooves 533, 534, 535, 536 and 537, these grooves delimiting the plate 519.

Numerous modifications may be made to the above described examples without departing from the scope of the invention. Thus, the positioning of the first and second beams may be different, these beams not being arranged in a middle plane or in the vicinity thereof.

Moreover, some parts of the micro-sensor cannot be made of silicon. The toothed wheels may for example be made of metal and the support made of the same material as the support structure.

Furthermore, at least four detection assemblies with different thresholds may be implemented on a support according to FIG. 2, or even two or three times that by arranging them in stages, as in the context of patent application FR2974410.

In addition, the first plate 119 may be replaced by a beam-type member.

The invention claimed is:

1. A passive and reversible micro-sensor of deformations along a longitudinal direction OX of a structure, particularly during temperature or mechanical stress cycles experienced by that structure, this micro-sensor comprising means for detecting and counting the cycles of variations in distance between two points or areas of a structure as well as:
   a support comprising:
       a first portion having an anchoring area adapted to be attached to a first one of said two points or areas of the structure,
       a second portion having an anchoring area adapted to be attached to the second one of said two points or areas of the structure,
       a third portion longitudinally arranged between the first portion and said first one of said two points or areas of the structure and attached by a first longitudinal end to the first portion,
       a fourth portion longitudinally arranged between the second portion and said second one of said two points or areas of the structure and attached by a first longitudinal end to the second portion,
   means for detecting and counting the cycles of variations in distance between said two points or areas of a structure comprising:
       at least a first counting toothed wheel arranged on one of said first, second, third and fourth portions,
       at least a third beam attached to the support and comprising a tooth at the third beam's free end, this tooth being adapted to mesh with said toothed wheel,
   wherein:
   the support comprises means for amplifying the value of a relative movement between said first and second portions of the support, these means comprising:
       a first beam attached at one end thereof to the third portion and at another end thereof to a first plate,
       a second beam attached at one of end thereof to the fourth portion and at another end thereof to said first plate,
   and the third beam is attached on one side to said plate, or to a member which is secured thereto,
   said plate and the first, second and third beams being arranged so that any variation in distance $\Delta x$ between said first and second portions of the support produces a corresponding movement $\Delta y$ of the plate of the tooth along a different direction and with $\Delta y > \Delta x$.

2. The passive and reversible micro-sensor according to claim 1, wherein $\Delta y > 4\Delta x$.

3. The passive and reversible micro-sensor according to claim 1, wherein:
   the third portion is longitudinally arranged between the first and second portions and connected by a first longitudinal end to the first portion by a thick cord,
   the fourth portion is longitudinally arranged between the first and second portions and connected by a first longitudinal end to the second portion by a thick cord,
   means for detecting and counting the cycles of variations in distance between two points or areas of a structure comprising:
       at least a first counting toothed wheel arranged on one of the third or fourth portions,
       at least a third beam attached to the support and comprising a tooth at the third beam's free end, this tooth being adapted to mesh with said toothed wheel,
   wherein:
   the support comprises means for amplifying the value of a relative movement between said first and second portions of the support, these means comprising:
       a first beam attached at one end thereof to the third portion and at another end thereof to a first plate,
       a second beam attached at one end thereof to the fourth portion and at another end thereof to said first plate,
   and the third beam is attached on one side to said plate, or to a member which is secured thereto,
   said plate and the first, second and third beams being arranged so that any variation in distance $\Delta x$ between said first and second portions of the support produces a corresponding movement $\Delta y$ of the plate of the tooth along a different direction and with $\Delta y > \Delta x$.

4. The passive and reversible micro-sensor according to claim 3, wherein $\Delta y > 4\Delta x$.

5. The passive and reversible micro-sensor according to claim 3, wherein the first end of fourth portion is also connected to the first longitudinal end of the third portion by a first, at least partially thin cord, and the second longitudinal end of the third portion is also connected to the second longitudinal end of the fourth portion by a second, at least partially thin cord.

6. The passive and reversible micro-sensor according to claim 1, wherein the first and second beams are parallel to each other.

7. The passive and reversible micro-sensor according to claim 6, wherein the third beam is arranged perpendicular to the first and second beams.

8. The passive and reversible micro-sensor according to claim 1, wherein the support comprises a longitudinal middle plane and the first and second beams form an angle with the middle plane between 0 and 45 degrees.

9. The passive and reversible micro-sensor according to claim 1, wherein the first and second beams are arranged on the same side of the plate.

10. The passive and reversible micro-sensor according to claim 1, wherein the plate and the first, second, third and fourth portions of the support are arranged in a same plane.

11. The passive and reversible micro-sensor according to claim 10, wherein the plate is arranged between the third and fourth portions of the support and delimited by a through groove except at the connections with said first and second beams.

12. The passive and reversible micro-sensor according to claim 1, wherein the first and second longitudinal beams have a length at least equal to half that of the third and fourth portions of the support, the measurements being taken along the longitudinal direction of the support.

13. The passive and reversible micro-sensor according to claim 1, wherein the means for detecting and counting comprise:
- a first toothed wheel arranged on the third portion of the support, the third beam comprising a tooth adapted to mesh with this first toothed wheel,
- a second toothed wheel arranged on the fourth portion of the support, a fourth beam arranged transversely and attached on one side to said plate and having, at its free end, a tooth adapted to mesh with said second toothed wheel.

* * * * *